(12) United States Patent
Bozenmayer

(10) Patent No.: US 6,974,161 B2
(45) Date of Patent: Dec. 13, 2005

(54) COUPLING DEVICE FOR CONNECTING A REPLACEABLE FILTER ELEMENT TO A CONDUIT

(75) Inventor: Kurt Bozenmayer, West Milford, NJ (US)

(73) Assignee: Graver Technologies, Inc., Glasgow, DE (US)

( * ) Notice: Subject to any disclaimer, the term of this patent is extended or adjusted under 35 U.S.C. 154(b) by 290 days.

(21) Appl. No.: 10/208,912

(22) Filed: Jul. 30, 2002

(65) Prior Publication Data

US 2004/0020836 A1 Feb. 5, 2004

(51) Int. Cl.⁷ ............................................. F16L 17/00
(52) U.S. Cl. ....................... 285/360; 285/317; 285/320; 29/890.14
(58) Field of Search ................................. 285/360, 361, 285/401, 402, 317, 320; 29/237, 240, 890.14

(56) References Cited

U.S. PATENT DOCUMENTS

| | | | | |
|---|---|---|---|---|
| 641,846 A | * | 1/1900 | Davenport et al. | 285/360 |
| 784,848 A | * | 3/1905 | Fullipp | 285/317 |
| 898,017 A | * | 9/1908 | Steen | 285/360 |
| 917,204 A | * | 4/1909 | Walther | 285/360 |
| 941,990 A | * | 11/1909 | Hickey | 285/361 |
| 948,437 A | * | 2/1910 | Wilson et al. | 285/360 |
| 980,677 A | * | 1/1911 | Rhoads | 285/360 |
| 1,143,020 A | * | 6/1915 | Bailey | 285/360 |
| 1,195,433 A | * | 8/1916 | Bailey | 285/360 |
| 1,525,794 A | * | 2/1925 | Blake | 285/360 |
| 1,622,216 A | * | 3/1927 | Anlauf et al. | 285/361 |
| 3,279,608 A | | 10/1966 | Soriente et al. | |
| 5,667,679 A | | 9/1997 | Bozenmayer et al. | |
| 6,315,334 B1 | * | 11/2001 | Garcia | 285/360 |

FOREIGN PATENT DOCUMENTS

FR 2658899 * 8/1991 ............... 285/317

* cited by examiner

Primary Examiner—David Bochna
(74) Attorney, Agent, or Firm—Piper Rudnick LLP

(57) ABSTRACT

A coupling device for connecting a filter element to a filter conduit has male and female couplings each having a passageway for fluid. The male coupling is secured to the filter conduit and has at least two radially projecting lugs. The female coupling is secured to the filter element and has at least two latching tabs for engaging the lugs. A spring is operatively mounted on the male coupling and interferes with the radially projecting lugs. The spring is disposed so as to engage at least one latching tab when the male and female couplings are moved toward each other. The spring urges the latching tabs to rotate in a first angular direction thereby causing the tab to latch to a lug of the male coupling.

20 Claims, 8 Drawing Sheets

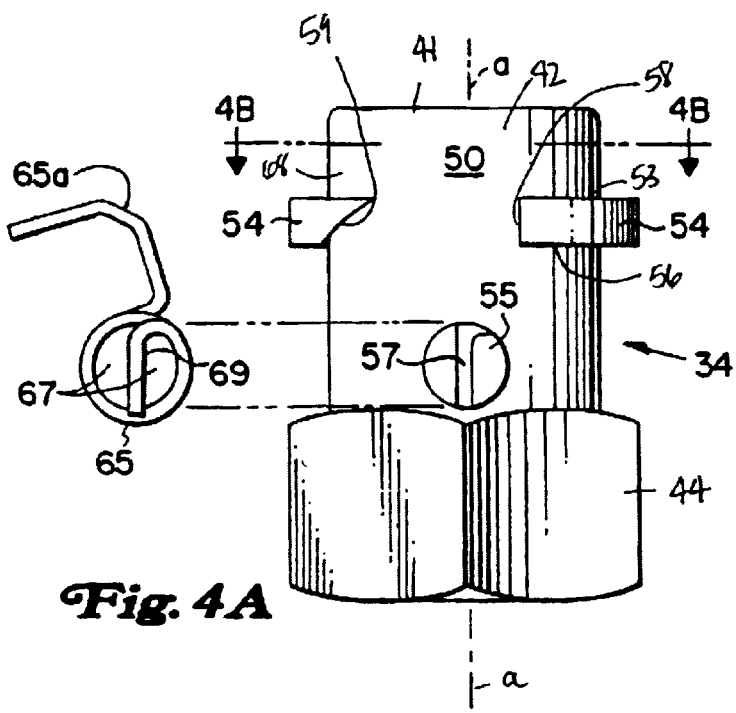
*Fig. 4A*
*Fig. 4B*
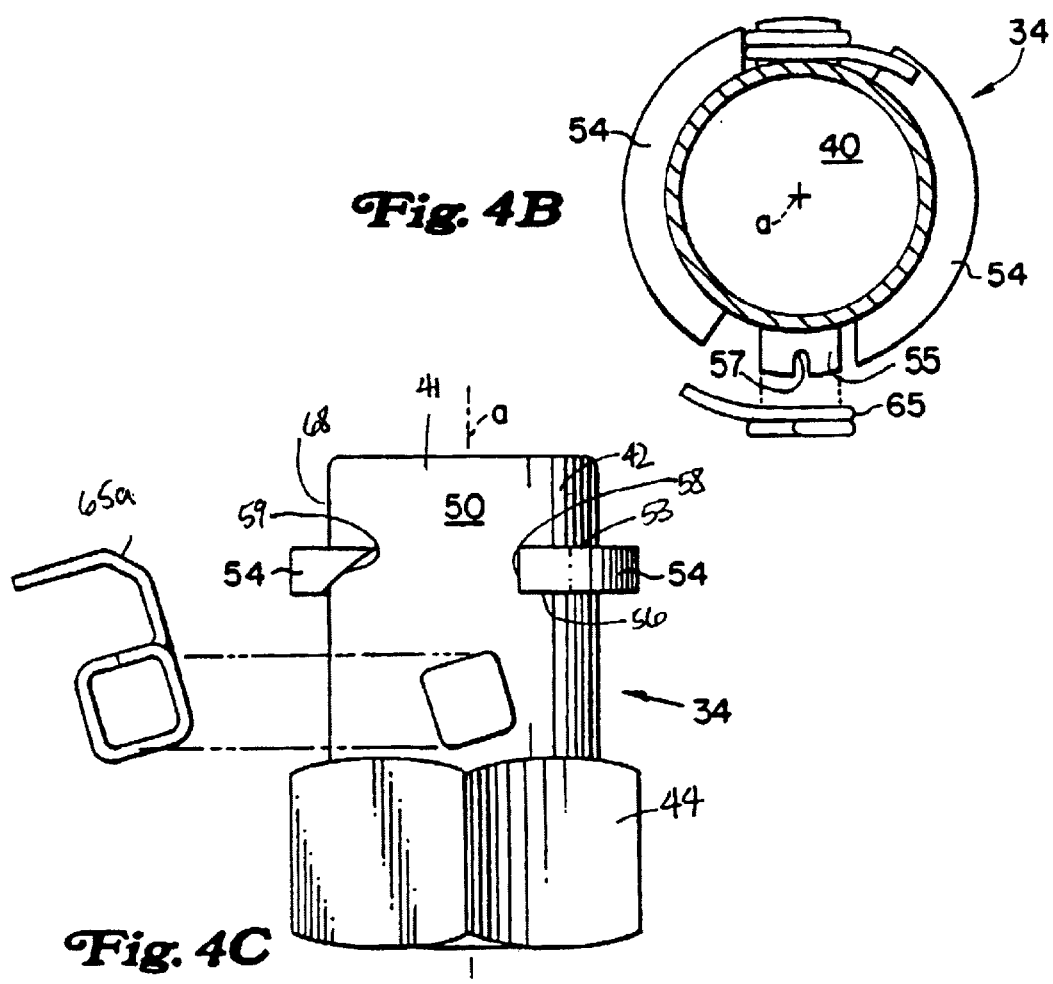
*Fig. 4C*

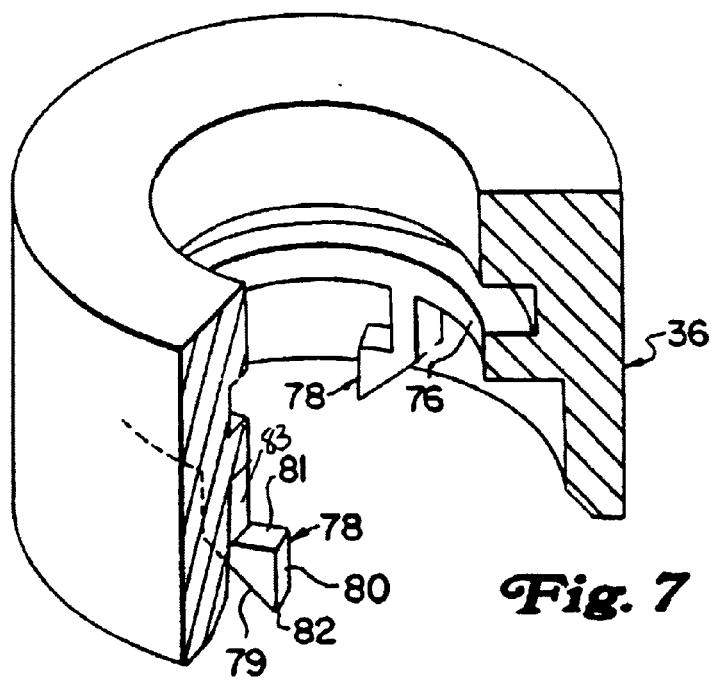
*Fig. 7*
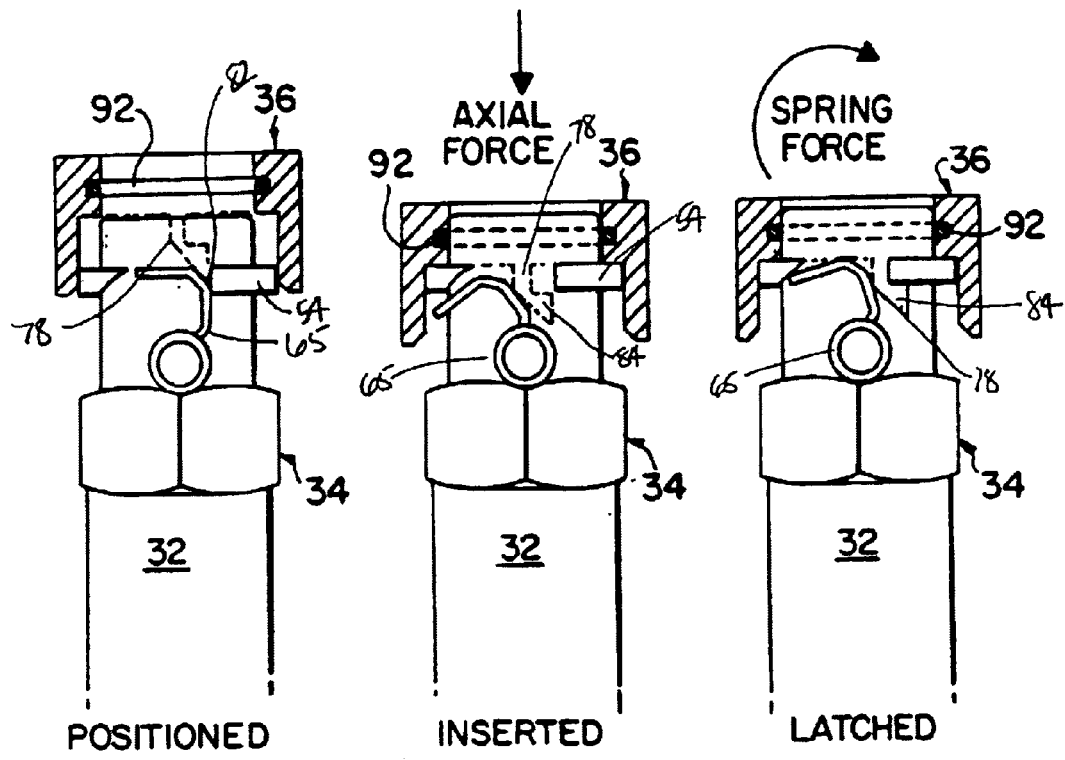
POSITIONED  INSERTED  LATCHED
*Fig. 8A*  *Fig. 8B*  *Fig. 8C*

COUPLING DEVICE FOR CONNECTING A REPLACEABLE FILTER ELEMENT TO A CONDUIT

TECHNICAL FIELD

The invention relates generally to a filter cartridge for a filter vessel in a fluid purification system, and more particularly to a coupling device used to connect a replaceable filter cartridge to an outlet tube in a filter vessel for purification of radioactive or other hazardous fluids.

BACKGROUND OF THE INVENTION

Power plants and other facilities with fluid purification processes frequently have used filter tanks or filter vessels to purify a variety of different liquids or gases, such as fluid fossil fuels, steam or water. Such filter vessels have an inlet supplying a fluid to a main filtration chamber holding a number of tubular filters. Long tubes within the filter vessel support and act as the core for the tubular filters. These long tubes extend from a tube sheet that separates the main chamber from a plenum for holding purified fluid. An outlet leads from the plenum to the exterior of the filter vessel.

In conventional practice, on the opposite end of the filters from the tube sheet, separate filter mount assemblies secure the filters to the tubes while sealing that end of the tube. The conventional filter mount assemblies contain numerous parts, which frequently fall into the filter vessel during disassembly of the mount assembly to replace the filters. Parts falling into the vessel must be removed to prevent damage to filter elements caused by motion of the loose parts during service flow. If loose parts cannot be readily located and removed with suitable "fishing" tools, filter elements must be removed to permit access to the vessel to retrieve the loose parts. U.S. Pat. No. 5,667,679 to Bozenmayer et al. attempts to solve this problem by providing a filter mount assembly that may be removed quickly without losing parts. This design, however, uses stainless steel parts that are difficult to dispose or recycle when radioactive, which condition may obtain in nuclear power plants.

Another problem associated with conventional filter mount assemblies relates to the ease of installation and removal. Rapid installation and removal of filter elements in radioactive steam systems or other hazardous environments is highly desirable to minimize worker exposure.

Referring to FIG. 1, another conventional filter vessel 100 has an inlet 102 that delivers unpurified, typically pressurized, fluids to a main chamber 104. The arrows F indicate direction of flow for the fluid during normal operations.

The fluid enters replaceable filter cartridges 106, as known in the art, and through known tubular filters contained thereby that remove unwanted particulate or foreign matter. The purified fluid then flows downward through tubes or pipes 108 that open up into a plenum 110. The plenum is separated from the main chamber 104 by a stainless steel or a carbon steel false bottom or tube sheet 112 conventionally welded to the tubes 108. The fluid then exits the filter vessel 100 through an outlet 114. Conventional filter vessels 100 typically vary in diameter from six inches to seven feet (and three foot to eight foot heights) depending on the quantity and size of filter elements contained therein. Vessels are known to accommodate anywhere from two to over 1000 filter cartridges.

Some conventional filter cartridges 106 are held in place by a hold down plate 116 as known in the art. The filter cartridges 106 are single open-ended with a closed top and a protruding bolt, post, rod or other connector 118 to extend upward through a hole in the hold down plate 116 for lateral support and to maintain distances between adjacent filter cartridges. The hold down plates 116 are usually bolted to the perimeter of the vessel or secured to the bottom by long connecting rods (not shown). Either mechanism provides downward force to seal the cartridges 106 to the tube sheet 112. Cartridges 106 that are held down by hold down plates 116 typically have a spigot that fits into holes in the tube sheet 112, and is sealed with either a flat gasket or one or more O-rings (not shown).

Some filter cartridges 106 have threaded bottoms for securing the filter cartridge to the tube sheet 112 and effecting a liquid tight seal, and these therefore do not require a hold down plate. However, threading of the filter cartridge 106 onto each of the tubes 108 requires numerous rotations of the filter cartridge 106 by a robot, hand, wrench, other special tool or automatic mechanism. The threading and unthreading of the filter cartridge 106 is a time consuming job which undesirably prolongs the worker's exposure to a hostile environment.

U.S. Pat. No. 3,279,608 to Soriente et al. discloses a guide rod and hook design used to mount a filter cartridge onto a tube welded to a tube sheet such as an Aegis™ Fossil Assembly as is known in the art. The filter cartridge has a guide rod welded to a plate with an end having a hook. A coil spring and nut are used to seal the top of the filter while compressing the filter cartridge against the tube to hold it in place against an adapter threaded permanently to the tube.

The upper end of the guide rod is used to attach to a positioning lattice for lateral stabilization. This design, however, still requires the unthreading of the nut to remove the filter cartridge from the tube, and the rivet hook is not considered to be of adequate strength for high pressure and highly corrosive nuclear power plant applications.

Another known filter cartridge and filter vessel eliminates the need for threading the filter cartridge to a tube on a tube sheet. As shown on FIGS. 2A–2D, a filter cartridge 500 has a steel adapter 502 that connects a filter 504 to a stainless steel filter vessel tube 506. As shown in FIGS. 2C–2D, a spring 508 applying forces of 50–60 pounds is located between a support ring 510 welded to the exterior of the tube 506 and two pins 512 also welded to the exterior of the tube 506. Referring to FIGS. 2B and 2C, the adapter 502 has two opposing slots 514 (only one shown) for receiving the pins 512 and has an annular groove 516 that slides over the pins 512 as the adapter 502 is rotated about the tube 506. Once the adapter is rotated 90°, as shown in FIG. 2D, the pins 512 are positioned in two opposing locking apertures 518.

In order to position a filter cartridge 500 on the tube 506, the filter cartridge must be pushed downward (axially) to engage the pins 512 and spring 508, and then rotated a full ninety degrees to place the pins 512 in the locking apertures 518. The spring 508 biases the adapter 502 upward to hold the pins 512 against the bottoms 520 of the locking apertures 518, which further stabilizes and secures the filter cartridge 500 on the tube 506.

In some nuclear power plant filter vessel applications, during backwashing (fluid flow in the upward direction on FIGS. 2A–2D) the spring and fluid can combine to form an axial force of over 100 pounds that impacts the filter cartridge 500. The adapter 502 must be made of steel to withstand this force, which is transmitted through the circular pins 512. Otherwise, the high axial forces will cause the pins 512 to rip through an adapter 502 made of a weaker material, such as plastic, and disengage the filter cartridge 500 during backwashing operations.

Radioactive steel hardware, however, is dangerous, difficult and expensive to handle when replacing filter cartridges. Steel hardware cannot be recycled or incinerated using present technology. Re-use of the hardware with new filter cartridges is not practical due to the amount of radiation to which the operator is exposed. For this reason alone, the hardware is often replaced rather than re-used. The discarded hardware that is disposed of as radioactive waste will incur a disposal cost that is ten times or more its initial cost.

Accordingly, what is needed is an inexpensive, easy to use filter mount assembly constructed of easily and economically disposable materials.

SUMMARY OF THE INVENTION

The present invention is directed to a coupling device for connecting a filter element to a fluid conduit. The coupling device includes a male and a female coupling member with each member having a passageway for fluid. The male coupling member has at least two radially projecting lugs. The female coupling member has at least two latching tabs that engage the radially projecting lugs of the male coupling member. A spring is operatively mounted on the male coupling member. The spring is disposed to engage at least one latching tab when the male and female coupling members are moved toward each other. The spring urges the latching tab to rotate in an axial direction thereby causing the latching tab to latch to the lug of the male coupling member.

Another aspect of the present invention is directed to a fluid coupling element with a first and second coupling member formed around an axis. The second coupling member is sealably matable to the first coupling member for the transmission of fluid therethrough. The first coupling member has a free end and a sidewall with a lug extending laterally from the sidewall. The lug has a latch surface formed at an angle to the axis. The lug also has a guide surface that extends from the latch surface toward the free end of the first coupling member. The second coupling member has a sidewall that terminates in a free end. The second coupling member also has a latch tab that terminates in an enlargement portion. A means for indexing, is mounted on the first coupling member, leads the enlargement of the latch tab to the guide surface of the lug. A spring is mounted on the first coupling member and is disposed to engage the second coupling member when the first coupling member is coupled to the second coupling member. The enlargement portion of the latch tab is urged against the guide surface of the lug by the spring. The enlargement portion of the latch tab clears the second surface of the lug when the first coupling member is mated to the second coupling member. The spring rotates the enlargement portion of the latch tab relative to the axis of the first coupling member so that the enlargement portion of the latch tab abuts the latch surface of the lug after the enlargement portion of the latch tab clears the guide surface of the lug.

Another aspect of the present invention is directed to a method of joining a first fluid carrying member to a second fluid carrying member so as to define a fluid path therebetween. A terminal portion of at least one latch tab of the first fluid carrying member is indexed to a guide surface of a lug extending from the sidewall of the second fluid carrying member. One of the first or second fluid carrying members is inserted into a second of the first or second fluid carrying members. The terminal portion of the latch tab is slid along the guide surface of the lug until an enlarged portion of the latch tab has moved axially farther away from the free end of the second fluid carrying member than a retaining surface of the lug. A spring is used to rotate the latch tab of the first fluid carrying member around the axis such that the enlarged portion of the latch tab becomes located adjacent the retaining surface of the lug.

BRIEF DESCRIPTION OF THE DRAWINGS

The above mentioned and other features of this invention and the manner of obtaining them will be apparent, and the invention itself will be best understood, by reference to the following description of illustrated embodiments of the invention in conjunction with the drawings, in which like characters identify like parts and in which:

FIG. 4A and 4B are partially exploded views of a male coupling portion of the coupling device in accordance with the present invention;

FIG. 4C is a partially exploded view of an alternative configuration of the male coupling portion of the coupling device in accordance with the present invention;

FIG. 7 is an isometric view of a latch ring attached to the female coupling of the coupling device in accordance with the present invention; and FIGS. 8A–8C are side views of the coupling device in accordance with the present invention.

DETAILED DESCRIPTION OF THE INVENTION

Figure 1:
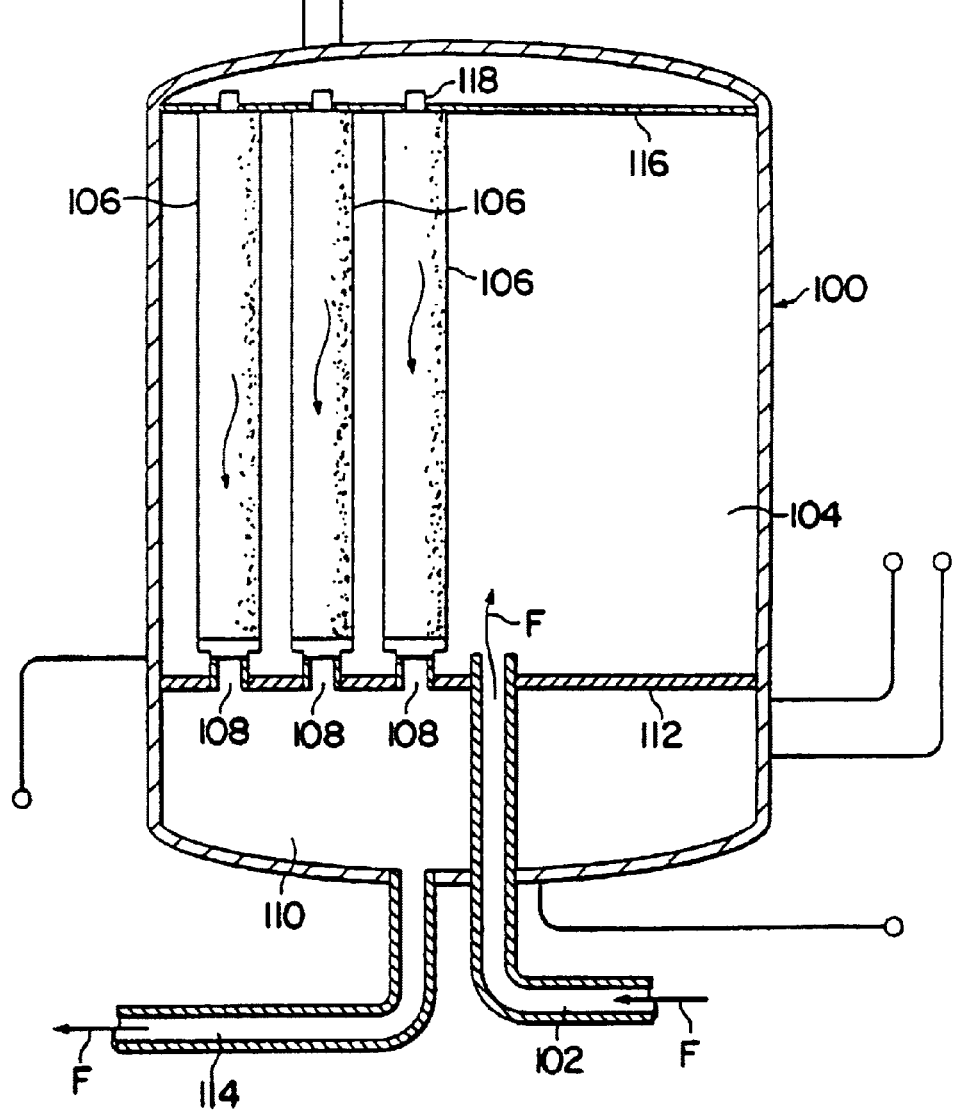
FIG. 1 is a cross-sectional side view showing components of a filter vessel as known in the prior art.
Figure 2A:
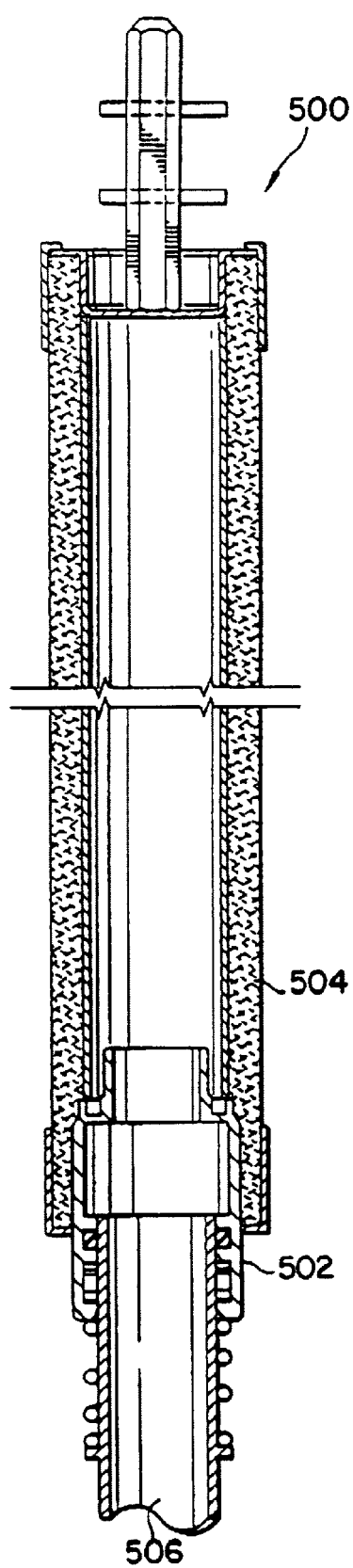
FIG. 2A is a cross-sectional side view of a filter cartridge to outlet tube connection as known in the art.
Figure 2D:
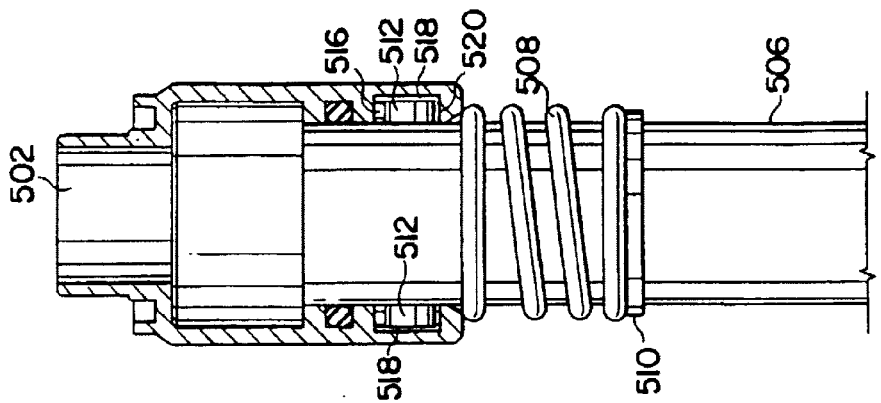
FIG. 2D is an assembled side view of the coupling device illustrated in FIG. 2A, as known in the art, with an upper portion of the coupling turned ninety degrees.
Figure 2C:
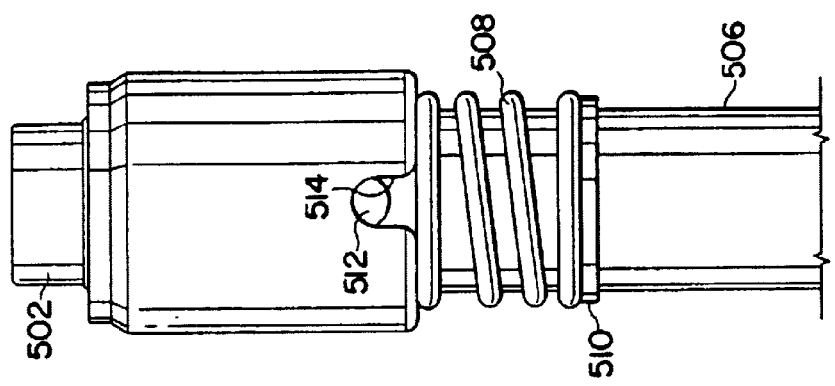
FIG. 2C is an assembled side view of the coupling device illustrated in FIG. 2A, as known in the art.
Figure 2B:
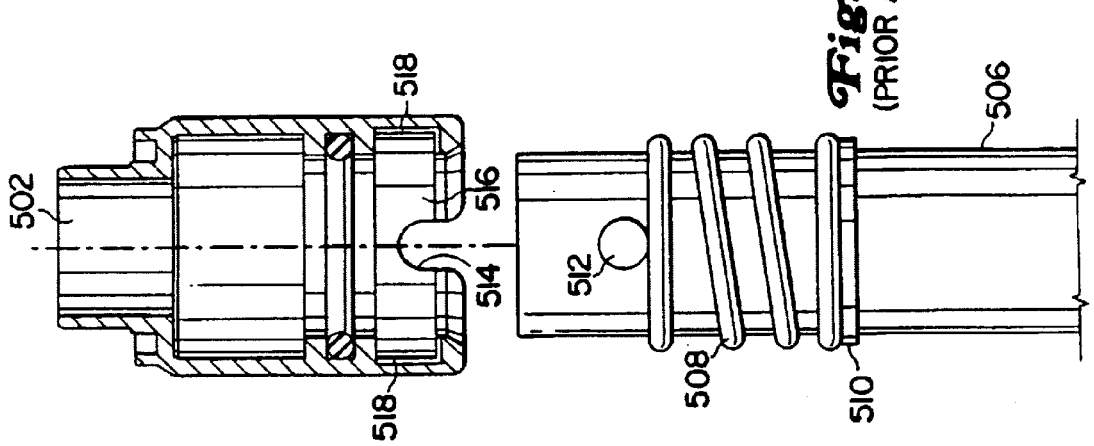
FIG. 2B is an exploded side view of a coupling device for the filter cartridge illustrated in FIG. 2A, as known in the art.
Figure 3A:
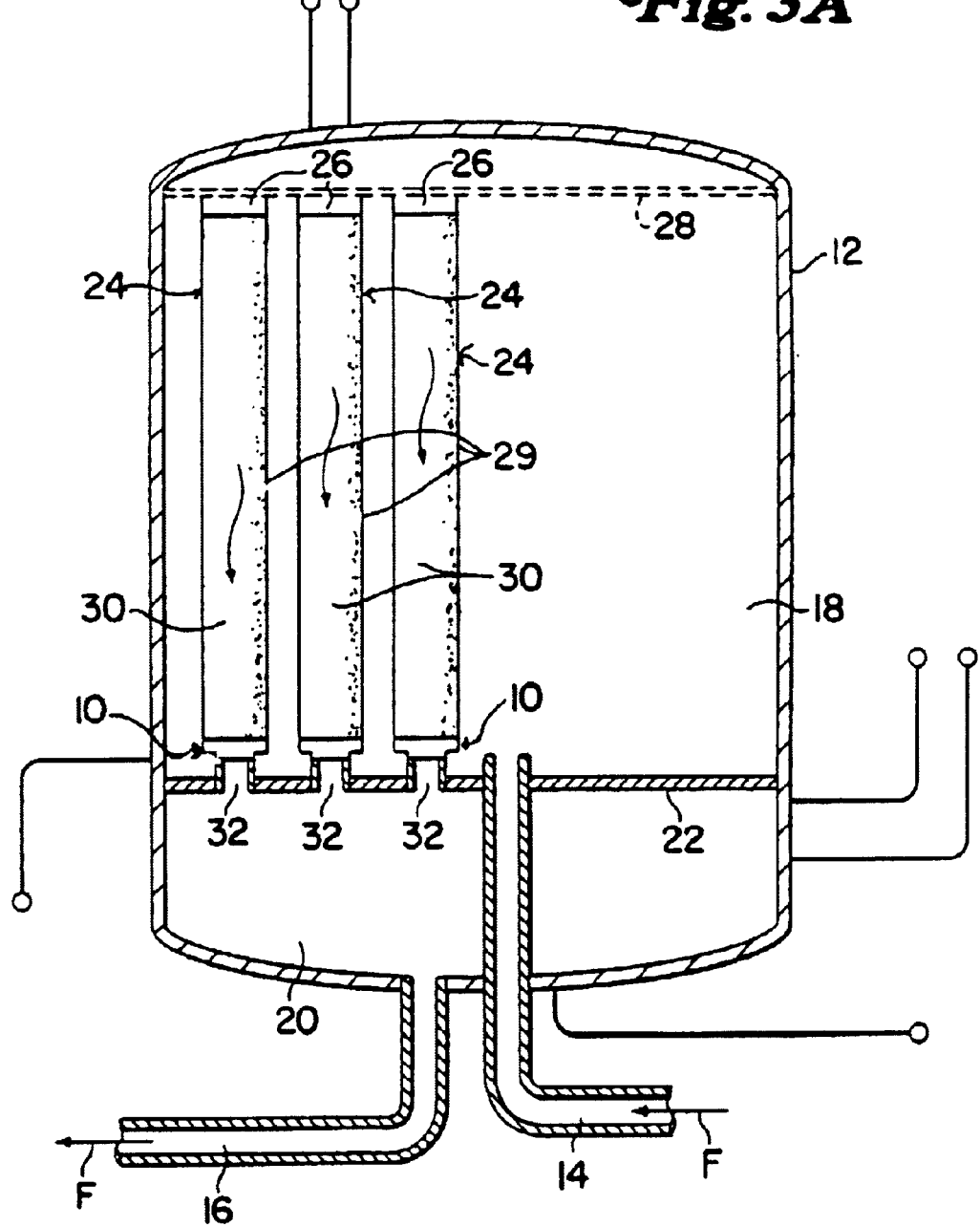
FIG. 3A is a cross-sectional side view showing components of a filter vessel in accordance with the present invention.

Referring to FIG. 3A, a filter vessel 12 has a fluid inlet 14, an outlet 16, a main filtration chamber 18 and a plenum 20 separated from the main chamber by a tube sheet or false bottom 22. While the filter vessel 12 is shown holding three filter elements or cartridges 24, it will be appreciated that filter vessels may be designed to accommodate any number of filter cartridges depending on the particular filtration requirements of the fluid system.

Each filter cartridge 24 has a top portion 26, preferably designed to be free standing, but alternatively supported laterally and/or vertically by a hold down plate or positioning lattice 28 as known in the art. The hold down plate or positioning lattice 28 may include spaced dimples (not shown) to mate with indents (not shown) on the top portion 26 of the filter cartridges 24, or posts or bolts (not shown) may extend from the top portion 26 to be inserted through holes in the hold down plate or positioning lattice 28 as known in the art.

Each filter cartridge 24 includes a housing 29 which holds a tubular filter 30, as known in the art, that includes yarn and/or pleated non-woven membrane surrounding a perforated core.

For radioactive filtering applications it is desirable to form the housing 29 from a material which can be readily shredded and incinerated. Preferably, the housing 29 is formed from a thermoplastic material such as polypropylene which may be reinforced with glass fiber or another filler.

Figure 3B:
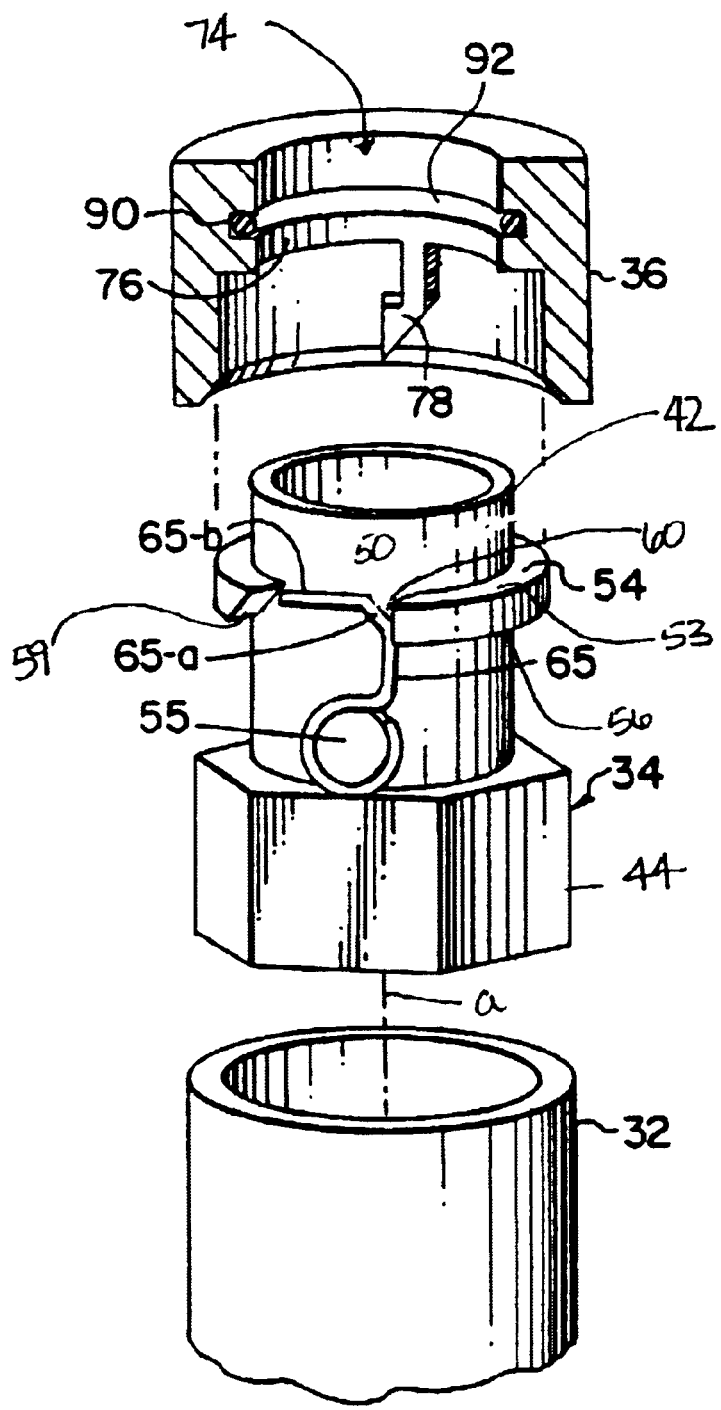
FIGS. 3B is a top and side exploded part isometric, part cross-sectional view, of male and female coupling portions of the coupling device in accordance with the present invention.

Referring now to FIG. 3B, a coupling device 10 according to the invention mounts each filter cartridge 24 onto a steel filter conduit or tube 32 integrally formed with, or welded to, the tube sheet 22. Each coupling device 10 includes a preferably stainless steel adapter or male coupling 34 and a non-steel adapter or female coupling 36 which is formed as part of the filter cartridge 24. The male coupling 34 is permanently attached to the filter conduit 32, as explained below.

It will be appreciated that the male coupling 34 may be made of any corrosion-resistant material of suitable strength as long as it is compatible with the hazardous or radioactive environment of the fluid process.

To facilitate disposal, the female coupling 36 may be formed of any material which is amenable to be shredded and incinerated. Preferably, the female coupling 36 is formed of a polymeric material, such as thermoplastic and thermosetting plastics, polymers and resins, that have sufficient structural strength to withstand, in the structures shown, at least 70 to 100 pounds in axial force without shearing, tearing or otherwise failing. A particularly preferred material includes injection molded polypropylene which may be reinforced.

The female coupling 36 may be continuously formed with the housing 29, or may be integrally attached thereto using any known method of attachment. For example, the female coupling 36 may be attached to the housing 29 by thermobonding, welding, chemical bonding, threading, pinning, or any other mechanical mechanism that provides an adequate seal between the housing 29 and the female coupling 36 while permitting the core of the filter to communicate with the core 74 of the female coupling 36.

It will be appreciated, however, when recycling or handling is not a concern, the female coupling 36 could be made of metal, such as stainless steel, as long as it is strong enough to withstand the impact of axial forces distributed by the lugs 54.

Referring to FIGS. 4A and 4B, in the preferred embodiment, the male coupling 34 has a generally cylindrical shape defining a hollow core 40 to be used as a fluid passageway and defining an axial direction or axis 'a'. The male coupling 34 also includes a cylindrical first upper portion 42 with a free end 41 that connects to the female coupling 36, and a second lower portion 44 that connects to the filter conduit 32, preferably by welding or threaded connection.

The inner diameters of the upper and lower portions are also different lengths to accommodate the sizes of the filter cartridge 24 and the filter conduit 32. The filter conduit 32 comes in a range of sizes from 1" to 6" outer diameter, but typically is provided with approximately 1½" outer diameter for both nuclear and fossil fuel applications, while the filter cartridges themselves are provided in the 2–2½" outer diameter range for most applications. The upper portion 42 of the male coupling 34 typically has inner diameter of 1¼ to 1½" for filter cartridges 24 spaced within the filter vessel 12 at 3 to 3½" centers.

In the preferred configuration, lugs 54 are welded to, or more preferably integrally formed with, the exterior sidewall 50 of the male coupling 34 so that the core 40 is not blocked by any support mechanism for the lugs 54. The lugs 54 project outwardly from the exterior sidewall 50 of the male coupling 34, preferably at right angles to axis a. The lugs 54 include an upper surface 53, a lower, retaining or latch surface 56, a guide surface 58 and a sloped, angled or concavely arcuate surface 59.

While the illustrated embodiment shows lugs 54 disposed about a single plane that is orthogonal to axis a, in an alternative embodiment the lugs can occupy segments of helical paths. In this alternative embodiment, each lug 54 would tilt upward from the junction of the guide surface 58 and the latching surface 56.

It will be appreciated that while lugs 54 are shown at diametrically opposite positions, many positions at angles to the axis 'a' are possible. Additionally, three, four or more lugs can be used rather than just the two lugs shown.

The male coupling 34 is fitted with one or more springs 65, preferably torsional, that are mounted to respective mounting posts or shanks 55 which extend from the exterior sidewall 50 of the male coupling 34 in a direction generally normal to the axis 'a'. See FIGS. 4A and 4B. Spring 65 defines an opening 67 which fits snugly into shank 55. In an assembled condition, the spring 65 is press fit onto the shank 55.

According to the embodiment illustrated in FIG. 4A, the shank 55 may be of circular cross-section and include a through hole or channel 57 formed proximate a terminal end thereof. The spring 65 may include a terminal loop end portion 69 adapted to snugly fit within the through channel 57. In this manner the through channel 57 and loop end portion 69 cooperatively prevent rotation of the spring 65 relative to the shank 55.

The shanks 55 are axially positioned to be near the lugs 54 such that each spring 65 contacts a lug 54 when installed on a shank 55. The spring 65 includes an elongated sloped portion 65a which, as will be described below, aids in orienting the female coupling 36 relative to the male coupling 34. The spring 65 also includes a free end 65b. As shown in FIG. 3B, when the spring 65 is positioned on the shank 55, a gap or indexing notch 60 is formed between the spring 65 and the guide surface 58 of each lug 54.

Alternatively, as illustrated in FIG. 4C, the shank has a non-circular cross-section to inhibit rotation of the spring relative to the shank.

Figure 5:
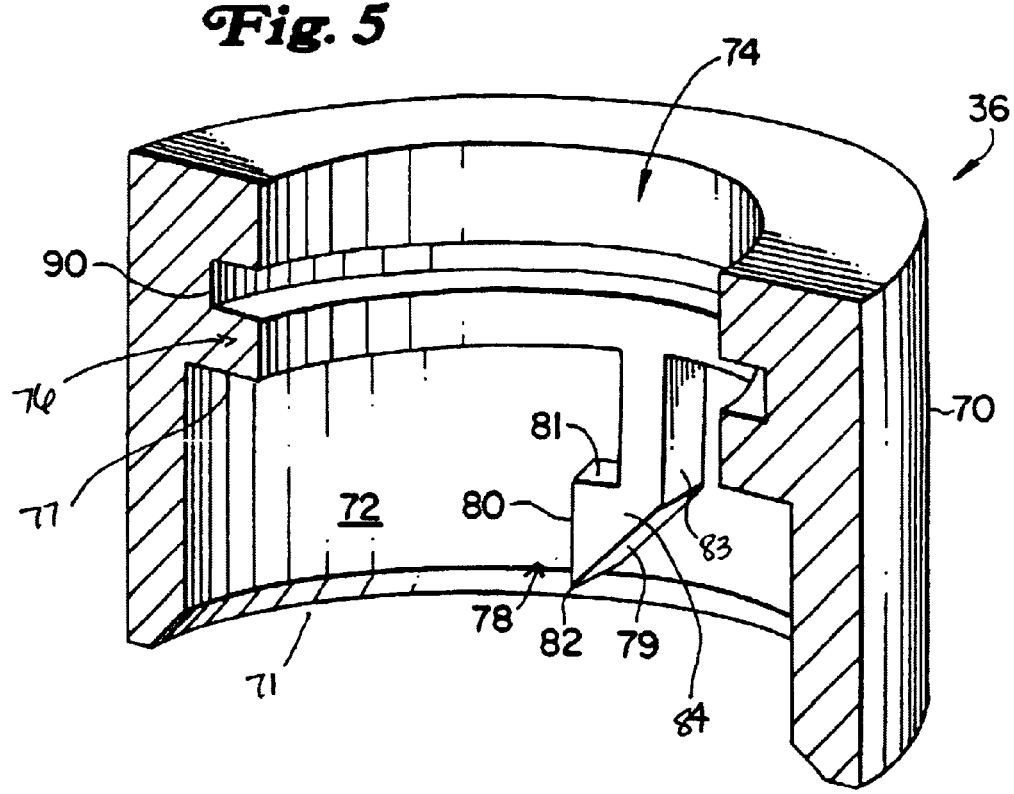
FIG. 5 is a cross-sectional isometric view of the female coupling in accordance with the present invention.
Figure 6:
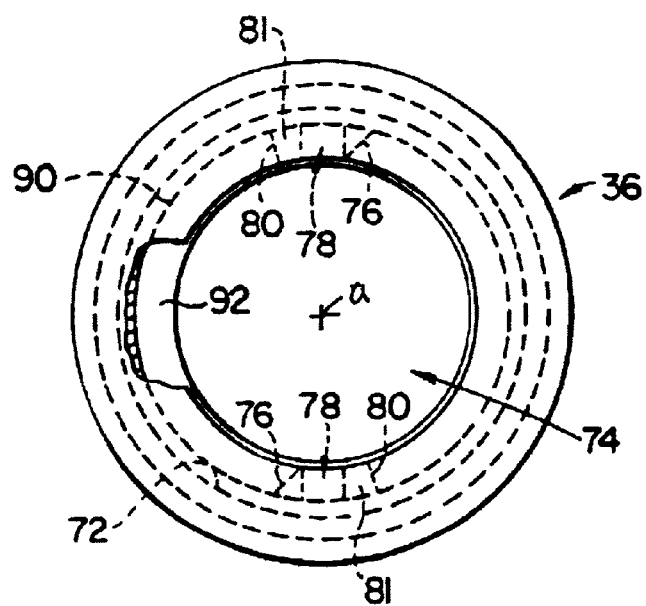
FIG. 6 is a top view of the female coupling in accordance with the present invention.

Referring now to FIGS. 5–7, in the illustrated embodiment the female coupling 36 has a preferably cylindrical body 70 with an interior cylindrical surface or side wall 72 that ends in a free end 71 and defines a hollow core 74 that provides a passageway for fluid and defines an axial direction or second axis 'a' in the general direction of flow through the female coupling 36.

The female coupling 36 features a latch ring 76 having a pair of preferably integrally formed latching tabs 78 which are sized to engage the lugs 54 (see FIG. 7). According to a preferred embodiment, the latch ring 76 is continuously and integrally formed with the female coupling 36 from the same material used to form the female coupling 36. Alternatively, the latch ring 76 may be formed separately from the female coupling 36, and press fit, glued or otherwise bonded to the hollow core 74 of the female coupling 36.

The latching tabs 78 are configured to engage and partially surround the lugs 54. The latching tabs 78 include an enlargement portion 84 defined by a bottom sloped surface 79, a side surface 80 and a top surfaces 81. The latching tabs 78 also include a leg 83 that extends downwardly from the latch ring 76 into the enlargement portion 84 of each latching tab 78. The top surfaces 81 of the latching tabs 78 are configured to engage the retaining or latching surfaces 56 of the lugs 54, and a lower surface 77 of the latching ring 76 engages an upper surfaces 53 of the lugs 54.

The retaining surface 56 of the lugs 54 may be formed at a slight angle relative to horizontal, in which case the top surface 81 of the latching tabs 78 would be formed at a complimentary angle to promote engagement therebetween.

The lugs 54 are extended circumferentially around the male coupling 34, leaving an opening sized to permit operation of the spring 65 and passage of the latching tabs 78. The free end 65b of each spring 65 is shaped to interfere with the lugs 54. Moreover, each lug 54 and spring 65 cooperatively defines a uniform path around which the latching tabs 78 may travel when the female coupling 36 is rotated.

The gap or indexing notch 60 is defined by the elongated sloped portion 65a of each spring 65 and the guide surface 58 of each lug 54. The gap or indexing notch 60 is configured to receive a point 82 of a respective latching tab 78 (see FIGS. 8A–8C).

The exterior side wall 50 has a portion 68 that defines a first surface of rotation around axis a that fits within the female coupling 36. The first surface of rotation 68 is provided with a generally smooth finish for slidably engaging a sealing member 92 within the female coupling 36. The first surface of rotation 68 is, in the illustrated embodiment, cylindrical, but could otherwise conform to conical, spherical, ellipsoidal or paraboloidal shapes, or other forms.

In operation, as illustrated in FIGS. 8A–8C, the female coupling 36 is coupled to the male coupling 34 by suspending the female coupling 36 vertically above the male coupling 34 with the latching tabs 78 resting on the lugs 54 of the male coupling 34. The female coupling 36 is then rotated until the point 82 of each latching tab 78 drops into the gap or indexing notch 60 cooperatively formed by the spring 65 and the lug 54 (see FIG. 8A).

An axial force is then applied to the female coupling 36 and attached filter cartridge 24 to push the female coupling 36 down onto the male coupling 34 against the spring 65 (see FIG. 8B). As a result of the interference between the point 82 of the latching tab 78, the lug 54 and the spring 65 causes the spring 65 to rotate counterclockwise (as viewed from above) to permit passage of the enlargement portion 84 of the latching tab 78. During this passage, guide surface 80 of the latch tab 78 slides by guide surface 58 of lug 54 (FIG. 4A).

Once enlarged portion 84 of the latching tab 78 has cleared the latching surface 56 of the lug 54, the spring 65 pushes against the female coupling 36 causing the top surface 81 of the latching tabs 78 to rotate clockwise (as viewed from above) into engagement with the latching surface 56 of each lug 54 (see FIG. 8C). Thereafter, the spring 65 provides a biasing force which deters inadvertent disengagement of the latching tab 78 from the lug 54.

To disengage the female coupling 36 from the male coupling 24, a user simply rotates the female coupling 36 in a counterclockwise direction (as viewed from above) until the top surface 81 of the latching tab 78 clears the retaining or latching surface 56 of the lug 54, and then lifts the female coupling 36 and attached filter cartridge 24.

Referring to FIGS. 5 and 6, the female coupling 36 also has an annular groove 90 opening on the interior side wall or second surface of rotation 72. The second surface of rotation 72 matches the first surface of rotation 68 of the male coupling 34. A sealing member 92 (FIGS. 8A–8C), such as an O-ring, fits snugly in the groove 90 (see FIG. 3B and FIG. 6). When the coupling device 10 is assembled, the sealing member 92 engages the first surface of rotation 68 on the male coupling 34, forming a tight seal that prevents unpurified material from bypassing the filter cartridge 24.

The number of latching tabs 78 (and lugs 54) dictate the maximum rotational displacement of the filter cartridge 24 until the point 82 of the latching tabs 78 finds a corresponding indexing notch 60. In the embodiment depicted, two latching tabs 78 are provided. Thus, the maximum rotational displacement until the point 82 of the latching tabs 78 falls into engagement with the indexing notch 60 is approximately 180 degrees. Providing additional latching tabs (and a corresponding number of lugs 54) will reduce the rotational displacement by a proportional amount. For example, the use of four latching tabs will reduce the maximum rotational displacement to approximately 90 degrees (¼ turn).

It will be appreciated that many alternative configurations fall within the scope of the present invention contemplated by the inventors. For instance, the filter cartridges 24 may hang down from an upper tube sheet 32. Additionally, a filter-side coupling may be a polymeric adapter or male coupling instead of the female coupling while a steel coupling may be permanently attached to the filter conduit as the conduit-side coupling.

The coupling device 10 has a polymeric female coupling 36 that can be incinerated or shredded along with other parts of the filter cartridge 24 for disposal after the female coupling 36 is used in hazardous or radioactive material processes. Incineration and shredding reduces volume of radioactive material which must be contained in secure containers at monitored storage facilities.

Also, the male coupling 34 has lugs 54 designed to spread an axial separation force laterally, by providing a generally flat predetermined retaining surface 56 on each lug 54 for impacting the top surface 81 of the latching tab 78 so the full force is not directed to a single point on the female coupling 36. The lugs 54, latching tabs 78 and springs 65 are configured so that only an axial force is needed to fully engage the female coupling 36 on the male coupling 34.

While various embodiments of the present invention have been shown and described, it should be understood that other modifications, substitutions and alternatives can be made without departing from the spirit and scope of the invention, which should be determined from the appended claims.

What is claimed is:

1. A coupling device for connecting a filter element to a fluid conduit, comprising:
    male and female couplings each having a passageway for fluid, the passageways defining an axial direction;
    the male coupling adapted to be secured to one of the fluid conduit and the filter element, the male coupling having at least two radially projecting lugs;
    the female coupling engaged with the male coupling for securing the filter element on the fluid conduit, the female coupling having at least two latching tabs for engaging with said lugs; and a spring operatively mounted on the male coupling, the spring disposed so as to engage at least one latching tab when the male and female couplings are moved toward each other, the spring urging the at least one latching tab to rotate around the axial direction in a first angular direction, rotation of the at least one tab in the first angular direction causing the at least one tab to latch to a lug of the male coupling.

2. The coupling device according to claim 1, wherein the male coupling defines an outer cylindrical surface having a circumference, and wherein the lugs are generally elongated along the circumference.

3. The coupling device according to claim 1, wherein the spring has a sloped surface which cooperatively defines a indexing notch with one of said lugs.

4. The coupling device according to claim 3, wherein the latching tabs each have a portion configured to be indexed by the indexing notch.

5. The coupling device according to claim 1, wherein the lugs and the latching tabs are configured and disposed on the female and male couplings so that the spring urges the at least one latching tab to latch to one of the at least two radially projecting lugs when the male coupling is pushed in the axial direction into engagement with the female coupling without any additional rotation force being applied.

6. The coupling device according to claim 1, wherein the lug and spring cooperatively define a uniform path around which the latching tab may travel when the female coupling is rotated.

7. A fluid coupling element, comprising:
a first coupling member formed around an axis;
a second coupling member formed around an axis and sealably matable to the first coupling member for the transmission of fluid therethrough;
the first coupling member having a sidewall and a free end, a lug extending laterally from the sidewall and having a latching surface formed at an angle to the axis of the first member, a guide surface extending from a second surface toward the free end;
the second coupling member having a sidewall terminating in a free end, a latch tab of the second coupling member having a length in the axial direction and terminating in an enlargement;
means for indexing mounted on the first coupling member and adaptable to index the enlargement of the latch tab to the guide surface of the lug; and
a spring mounted on the first coupling member and disposed to engage the second coupling member when the first coupling member is coupled to the second coupling member, the enlargement of the latch tab urged against the guide surface of the lug by the spring, the length of the latch tab being longer than a length of the guide surface such that the enlargement of the latch tab thereof will clear the latch surface of the lug upon the first coupling member being mated to the second coupling member, the spring rotating the enlargement of the latch tab relative to the axis of the first member so that the enlargement of the latch tab abuts the latching surface of the lug after the enlargement of the latch tab clears the guide surface of the lug.

8. The fluid coupling element of claim 7, wherein the first coupling member has a plurality of lugs which are adapted to be engaged with respective ones of a plurality of latch tabs of the second coupling member.

9. The fluid coupling element of claim 7, wherein the first coupling member is male and the second coupling member is female.

10. The fluid coupling element of claim 7, wherein the lug of the first coupling member projects outwardly from the sidewall of the first coupling member at a right angle to the axis.

11. The fluid coupling element of claim 7, wherein the means for indexing the enlargement of the latch tab to the guide surface comprises a gap bounded on one side by the guide surface and on an opposed side by the spring.

12. The fluid coupling element of claim 11, wherein the spring has an elongated sloped portion and moves between an unengaged position proximate the guide surface and an engaged position, the sloped portion receiving the enlarged portion of the latch tab when the latch tab is indexed to the gap.

13. The fluid coupling element of claim 12, wherein the enlarged portion of the latch tab has a sloped surface which slides against the sloped portion of the spring when the first coupling member is mated to the second coupling member.

14. The fluid coupling element of claim 11, wherein the enlargement of the latch tab is pointed such that it will index into the gap.

15. The fluid coupling element of claim 7, wherein the enlargement of the latch tab has defined thereon a sliding surface adaptable to slide on and past the guide surface of the lug.

16. The fluid coupling element of claim 7, wherein the guide surface of the lug is substantially vertical.

17. The fluid coupling element of claim 7, wherein the free end of the first coupling member is displaced from an axial position of said at least one lug, the second coupling member having a circumferential O-ring mounted to be adjacent the sidewall of the second coupling member, a sidewall portion of the first coupling member disposed between the lug and the free end of the first coupling member and sealably engaging with the O-ring of the second coupling member.

18. The fluid coupling element of claim 7, wherein the spring is a torsion spring.

19. The fluid coupling element of claim 7, wherein the lug and spring cooperatively define a uniform path around which the latching tab may travel when the second coupling member is rotated.

20. A method of joining a first fluid carrying member to a second fluid carrying member so as to define a fluid path therebetween along an axis, comprising the steps of:
indexing a terminal portion of at least one generally L-shaped latch tab of the first fluid carrying member to a guide surface of a lug extending from a sidewall of a second fluid carrying member;
inserting one of the first and second fluid carrying members into a second of the first and second fluid carrying members;
responsive to said step of inserting, sliding the terminal portion of said at least one generally L-shaped latch tab along the guide surface of said at least one lug until an enlarged portion of the latch tab has moved axially farther away from the free end of the second fluid carrying member than a retaining surface of the lug, the retaining surface of the lug facing away from the free end of the second fluid carrying member; and
using a spring to rotate the generally L-shaped latch tab of the first fluid carrying member around the axis such that the enlarged portion of the latch tab becomes located adjacent the retaining surface of the lug.

* * * * *